A. OPSAL.
CHOKER LINE FOR LOG HAULING CABLES.
APPLICATION FILED OCT. 19, 1908.
917,738.
Patented Apr. 6, 1909.
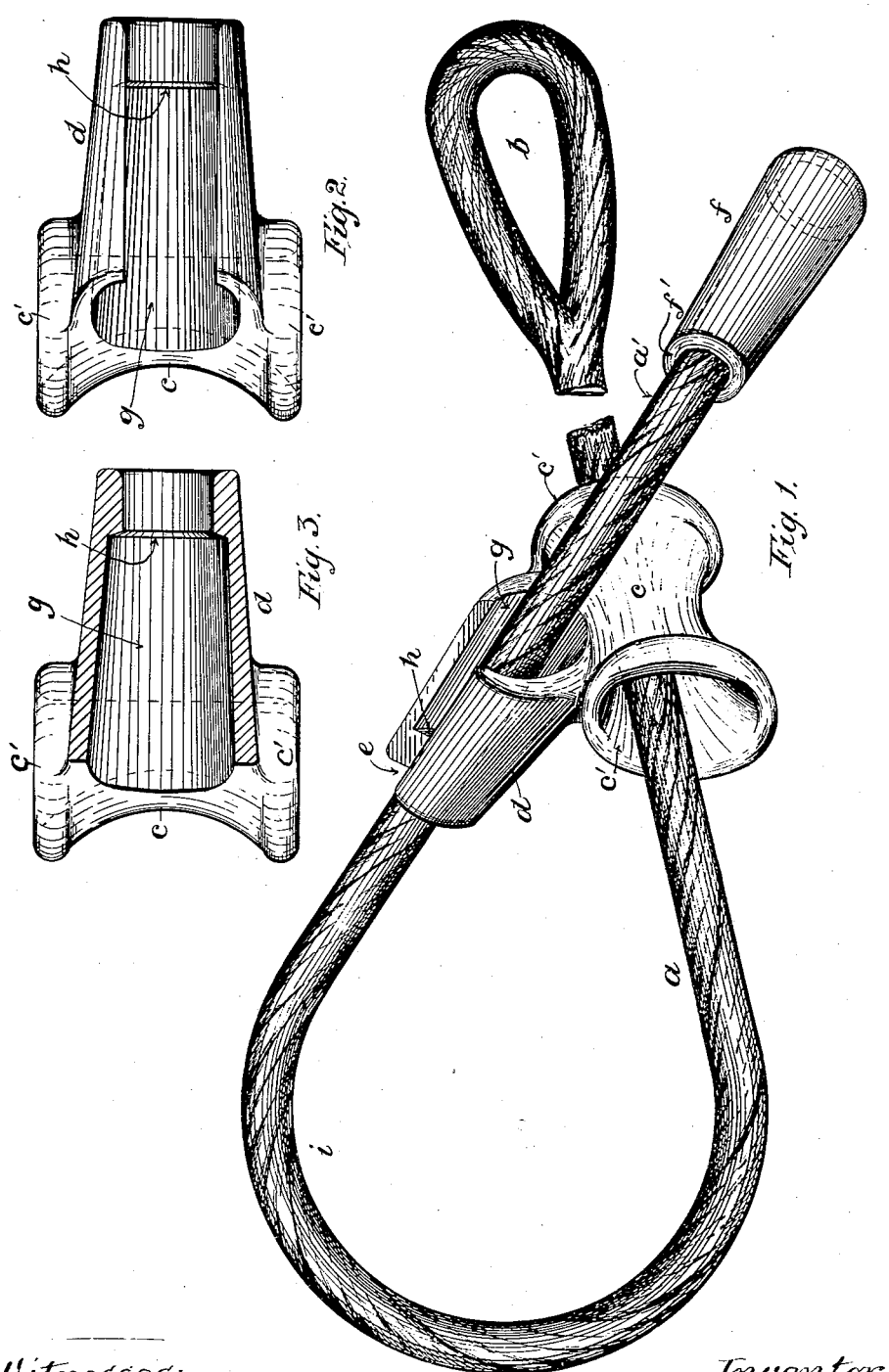
Witnesses:
S. M. Philbrick
Cecil Long
Inventor:
Andrew Opsal
by T. J. Geisler
Atty.

UNITED STATES PATENT OFFICE.

ANDREW OPSAL, OF PORTLAND, OREGON.

CHOKER-LINE FOR LOG-HAULING CABLES.

No. 917,738.  Specification of Letters Patent.  Patented April 6, 1909.

Application filed October 19, 1908. Serial No. 458,515.

*To all whom it may concern:*

Be it known that I, ANDREW OPSAL, a citizen of the United States, and resident of Portland, in the county of Multnomah and State of Oregon, have invented a new and useful Improvement in Choker-Lines for Log-Hauling Cables, of which the following is a specification, reference being had to the accompanying drawings as constituting a part thereof.

This invention relates to the short length of the cable, commonly called "choker-line", which is fastened at one end to the main hauling-cable, and the other end thereof being wrapped like a noose around the log to be hauled. The same contrivance is also used for many other kindred purposes.

In the general construction of the choker-line heretofore in use, the same consisted of a short length of cable, made with an eye at one end, and provided with a slip-sleeve to which the other end of the choker-line is detachably fastened; and my invention concerns such fastening means.

The object of my invention is to provide inexpensive and durable means arranged to facilitate the rapid fastening and undoing of the noose-end of the choker-line; at the same time so securely holding said end that it cannot accidentally become unfastened. And I obtain the latter effect by allowing the "spring" or reflex of the noose-end of the choker-line to restrain the fastening means from becoming undone.

To this end my invention is arranged and comprises the features hereinafter fully described.

In the drawings: Figure 1 is a perspective view of a choker-line provided with my improved means for fastening the noose-end thereof, the parts being shown in the position they would appear in when in the act of fastening or unfastening the noose-end of the choker-line from the slip-sleeve; Fig. 2 is a plan or top view of the slip-sleeve embodying my invention; and Fig. 3 is a plan section of the latter.

The letters designate the parts referred to.

The cable, $a$, is provided at one end with an eye $b$, for attachment to the butt hook of the main hauling line. On the cable, $a$, is provided a slip-sleeve $c$, the ends $c'$ of which are made flaring, as commonly done to prevent wear of the cable. Integrally made with the slip-sleeve $c$ is a laterally projecting socket-piece $d$, the upper face of which is made with a slot $e$, so as to permit the insertion and removal of the noose-end $a'$ of the cable $a$, as illustrated in Fig. 1. Said noose-end $a'$ is provided with a ferrule $f$, in which the extremity of the noose-end $a'$ is secured by filling the eye of the ferrule $f$ with babbitt, as usually done, and in order to allow ample room for the babbitt, the ferrule $f$ is preferably made of conical form, thus providing a conical eye. The cavity $g$ of the socket $d$ is made to conform to the exterior of the ferrule $f$; and near the outer end of the socket $d$ I provide a shoulder $h$, upon which is seated the shoulder $f''$ of the ferrule $f$.

The making of the ferrule $f$ of conical shape, as described, is merely a matter of convenience and not of essence to my invention, since the ferrule $f$ is not designed to bind in the tapering cavity $g$ of the socket $d$, for this would prevent the convenient disengagement of the parts; to the contrary the pulling strain of the noose-end $a'$ of the cable is entirely borne by the abutment of the shoulder $f''$ of the ferrule $f$, upon the shoulder $h$ of the socket $d$; and by this means the process of fastening and unfastening the noose-end $a'$ of the choker-line is rendered a convenient and rapid operation.

The spring inherent in the curved portion $i$ of the choker-line operates to restrain the ferrule $f$ from displacement; in other words, the partially encircling walls of the socket $d$, as evident, would prevent the ferrule from lifting out of place, and the spring of the line-portion $i$ forcibly draws and holds the shoulder of the ferrule $f$ aganist the interior shoulder of the socket $d$.

Incidentally the construction described also has this benefit: The shoulder $h$ of the socket $d$ virtually takes the entire strain or stress on the noose-end of the choker-line, thereby relieving the sides of the socket $d$ from a transverse or lateral stress, which would be imposed thereon if the locking of the ferrule $f$ in place were to depend upon a wedge-like action in the slotted socket $d$. The abutment of the shoulder $f''$ of the ferrule upon the shoulder $h$ of the socket indeed prevents the ferrule from becoming wedged in the socket $d$. On the other hand, the tapering construction of the ferrule and its socket facilitates the rapid disengagement of the parts.

I claim:

1. In a choker-line, the combination of a cable provided with an enlargement at the extremity of the noose-end, a sleeve on the cable, a socket on the sleeve, and a shoulder on the interior of the socket arranged to engage with said enlargement of the noose-end, said socket being slotted to permit the insertion and removal of the latter.

2. In a choker-line, the combination of a cable, a ferrule affixed on the extremity of the noose-end thereof, said ferrule provided with a bearing head, a sleeve on the cable, a socket on the sleeve, said socket being slotted to permit the insertion and removal of the noose-end, and a shoulder provided on the interior of the socket and arranged to serve as a bearing for said ferrule on the noose-end, when the latter is inserted in said socket.

3. In a choker-line, the combination of a cable, a tapering ferrule affixed on the extremity of the noose-end thereof, said ferrule provided with a bearing head, a sleeve on the cable, a tapering socket on the sleeve, said socket being slotted to permit the insertion and removal of the noose-end, and a shoulder provided on the interior of the socket and arranged to serve as a bearing for said ferrule on the noose-end, when the latter is inserted in said socket.

ANDREW OPSAL.

Witnesses:
T. J. GEISLER,
CECIL LONG.